(12) United States Patent
Mehta et al.

(10) Patent No.: US 10,523,556 B2
(45) Date of Patent: Dec. 31, 2019

(54) METHOD AND SYSTEM FOR ROUTING CONNECTIONS IN A SOFTWARE-DEFINED WIDE AREA NETWORK

(71) Applicant: Versa Networks, Inc., Santa Clara, CA (US)

(72) Inventors: Apurva Mehta, Cupertino, CA (US); Priyank Warkede, Cupertino, CA (US); Jayakrishnan Iyer, Morgan Hill, CA (US); Roopa Bayar, Santa Clara, CA (US); Akshay Adhikari, San Jose, CA (US); Shiva Shenoy, Los Altos, CA (US); Vignesh Chinnakkannu, Gilroy, CA (US)

(73) Assignee: Versa Networks, Inc., Santa Clara, CA (US)

( * ) Notice: Subject to any disclaimer, the term of this patent is extended or adjusted under 35 U.S.C. 154(b) by 53 days.

(21) Appl. No.: 15/672,238

(22) Filed: Aug. 8, 2017

(65) Prior Publication Data

US 2019/0052558 A1 Feb. 14, 2019

(51) Int. Cl.
*H04L 12/721* (2013.01)
*H04L 12/715* (2013.01)
*H04L 12/24* (2006.01)
*H04L 12/26* (2006.01)
*H04L 12/28* (2006.01)

(52) U.S. Cl.
CPC .......... *H04L 45/127* (2013.01); *H04L 41/142* (2013.01); *H04L 41/5009* (2013.01); *H04L 45/124* (2013.01); *H04L 45/64* (2013.01); *H04L 12/2854* (2013.01); *H04L 43/16* (2013.01)

(58) Field of Classification Search
None
See application file for complete search history.

(56) References Cited

U.S. PATENT DOCUMENTS

| | | | | |
|---|---|---|---|---|
| 8,023,421 | B2* | 9/2011 | Lloyd | H04L 41/0816 370/252 |
| 8,289,845 | B1* | 10/2012 | Baldonado | H04L 43/50 370/229 |
| 8,948,032 | B1* | 2/2015 | Sampath | H04L 12/4641 370/252 |
| 9,338,065 | B2* | 5/2016 | Vasseur | H04L 41/5009 |
| 9,596,167 | B1* | 3/2017 | Jacob | H04L 12/4641 |
| 9,614,779 | B2* | 4/2017 | Sesha | G06F 9/505 |
| 9,769,044 | B1* | 9/2017 | Cirkovic | H04L 43/0876 |
| 10,091,070 | B2* | 10/2018 | Chopra | H04L 41/147 |

(Continued)

*Primary Examiner* — Donald L Mills
(74) *Attorney, Agent, or Firm* — Loza & Loza, LLP; Mark A. Wilson

(57) ABSTRACT

In accordance with an embodiment of the invention, a method for routing connections in an SD-WAN is disclosed. The method involves receiving TURN server performance metrics via Border Gateway Protocol (BGP) and receiving network performance metrics from calculations made using Service Level Agreement (SLA) protocol data units (PDUs) for TURN servers in an SD-WAN, generating a score for at least one TURN server in the SD-WAN based on the received TURN server performance metrics and received network performance metrics for the at least one TURN server, selecting a TURN server based on the score generated for the at least one TURN server, and routing a connection over the selected TURN server.

20 Claims, 14 Drawing Sheets

(56) References Cited

U.S. PATENT DOCUMENTS

| | | | | |
|---|---|---|---|---|
| 2012/0290716 A1* | 11/2012 | Ogielski | H04L 41/00 | 709/224 |
| 2013/0246654 A1* | 9/2013 | Cicic | H04L 45/00 | 709/238 |
| 2014/0259108 A1* | 9/2014 | Clark | H04L 63/08 | 726/3 |
| 2015/0113154 A1* | 4/2015 | Nguyen | H04L 67/141 | 709/228 |
| 2015/0230123 A1* | 8/2015 | Kotecha | H04W 48/17 | 370/235 |
| 2015/0256622 A1* | 9/2015 | Kawazoe | H04L 67/1097 | 709/227 |
| 2015/0271102 A1* | 9/2015 | Antich | H04L 47/825 | 370/230 |
| 2015/0333953 A1* | 11/2015 | Vasseur | H04L 41/0668 | 370/228 |
| 2016/0026922 A1* | 1/2016 | Vasseur | G06N 99/005 | 706/12 |
| 2016/0028632 A1* | 1/2016 | Vasseur | H04L 12/28 | 370/237 |
| 2016/0094431 A1* | 3/2016 | Hall | G06F 16/282 | 709/224 |
| 2016/0173619 A1* | 6/2016 | Singleton, IV | H04L 67/1034 | 709/203 |
| 2016/0380892 A1* | 12/2016 | Mahadevan | H04L 45/02 | 370/389 |
| 2017/0054784 A1* | 2/2017 | Panattu | H04L 65/80 | |
| 2017/0111233 A1* | 4/2017 | Kokkula | H04L 41/145 | |
| 2017/0289027 A1* | 10/2017 | Ratnasingham | H04L 45/50 | |
| 2017/0346722 A1* | 11/2017 | Smith | H04L 1/008 | |
| 2017/0366604 A1* | 12/2017 | McDuff | H04L 67/1002 | |
| 2018/0234333 A1* | 8/2018 | Inamdar | H04L 47/122 | |
| 2019/0028909 A1* | 1/2019 | Mermoud | H04W 24/08 | |
| 2019/0036814 A1* | 1/2019 | Aranha | H04L 45/38 | |
| 2019/0036816 A1* | 1/2019 | Evans | H04L 43/08 | |
| 2019/0036828 A1* | 1/2019 | Bajaj | H04L 47/2425 | |

* cited by examiner

METHOD AND SYSTEM FOR ROUTING CONNECTIONS IN A SOFTWARE-DEFINED WIDE AREA NETWORK

BACKGROUND

Traditionally, managed network and security service offerings have required a hardware-based approach, which can be slow and expensive to deploy, can require proprietary appliances, and are typically designed around a closed architecture that can be difficult to scale up and/or integrate with third party technologies. By transitioning from a hardware-based approach to a software-based approach, the flexibility of network virtualization can be appreciated for its greater service agility and reduced expenses.

However, while a network managed using a software-based approach has many advantages over a network managed using a hardware-based approach, some challenges exist in both networks. For example, implementing a network with a full mesh topology can be more difficult if one or more endpoints are behind a network address translation (NAT) device. In order to solve this challenge, a Traversal Using Relays around NAT (TURN) server may be used.

SUMMARY

In an embodiment, a method for routing connections in an SD-WAN is disclosed. The method involves receiving TURN server performance metrics via Border Gateway Protocol (BGP) and receiving network performance metrics from calculations made using Service Level Agreement (SLA) protocol data units (PDUs) for TURN servers in an SD-WAN, generating a score for at least one TURN server in the SD-WAN based on the received TURN server performance metrics and received network performance metrics for the at least one TURN server, selecting a TURN server based on the score generated for the at least one TURN server, and routing a connection over the selected TURN server.

In another embodiment, the connection is routed from a preferred TURN server when the score of the preferred TURN server falls below a predefined threshold and restored to the preferred TURN server when the score of the preferred TURN server exceeds a predefined threshold.

In another embodiment, generating the score for the at least one TURN server in the SD-WAN comprises scoring network performance as a function of the network performance metrics and scoring TURN server performance as a function of the TURN server performance metrics, and generating the score as a function of the network performance score and the TURN server performance score.

In another embodiment, the score is further generated as a function of a black list score for a given application.

In another embodiment, the score is further generated as a function of a manually determined score.

In another embodiment, scoring network performance as a function of the network performance metrics comprises evaluating network performance metrics of the at least one TURN server to determine if the network performance metrics exceed a threshold.

In another embodiment, scoring TURN server performance metrics comprises evaluating TURN server performance metrics of the at least one TURN server to determine if the TURN server performance metrics exceed a threshold.

In another embodiment, the score for the at least one TURN server in the SD-WAN is determined based on at least one of an application generating traffic routed over the TURN server and a tenant using the TURN server.

In another embodiment, a system for routing connections in an SD-WAN is disclosed. In the embodiment, the system comprises a SD-WAN controller and a plurality of nodes communicatively coupled to the SD-WAN controller, wherein at least one of the SD-WAN controller and a node in the plurality of nodes is configured to receive TURN server performance metrics via Border Gateway Protocol (BGP) and receiving network performance metrics from calculations made using Service Level Agreement (SLA) protocol data units (PDUs) for TURN servers in an SD-WAN, generate a score for at least one TURN servers in the SD-WAN based on the received TURN server performance metrics and the received network performance metrics for the at least one TURN server, select a TURN server based on the score generated for the at least one TURN server, and route a connection over the selected TURN server.

In another embodiment, the connection is routed from a preferred TURN server when the score of the preferred TURN server falls below a predefined threshold and restored to the preferred TURN server when the score of the preferred TURN server exceeds a predefined threshold.

In another embodiment, the system is configured to generate the score for at the least one TURN server in the SD-WAN by scoring network performance as a function of the network performance metrics and scoring TURN server performance as a function of the TURN server performance metrics and generating the score as a function of the network performance score and the TURN server performance score.

In another embodiment, the score is further generated as a function of a black list score for a given application.

In another embodiment, the score is further generated as a function of a manually determined score.

In another embodiment, scoring network performance as a function of the network performance metrics comprises evaluating network performance metrics of the at least one TURN server to determine if the network performance metrics exceed a threshold.

In another embodiment, scoring TURN server performance metrics comprises evaluating TURN server performance metrics of the at least one TURN server to determine if the TURN server performance metrics exceed a threshold.

In another embodiment, the score for the at least one TURN server in the SD-WAN is determined based on at least one of an application generating traffic routed over the TURN server and a tenant using the TURN server.

In another embodiment, a method for routing connections in an SD-WAN is disclosed. In the embodiment, the method comprises receiving at least one Border Gateway Protocol (BGP) update message from at least one TURN server a set of TURN servers in a SD-WAN, extracting TURN server performance metrics from a Network Layer Reachability Information (NLRI) field in the at least one BGP update message, receiving at least one Service Level Agreement (SLA) protocol data unit (PDU) from the at least one TURN server, extracting operational information from the at least one SLA PDU, calculating network performance metrics for the at least one TURN server from the operational information extracted from the SLA PDU, generating a score for the at least one TURN server based on the TURN server performance metrics and the network performance metrics, selecting a TURN server from the set of TURN servers in the SD-WAN based on the score generated for the at least one TURN server in the set of TURN servers, and routing a connection over the selected TURN server.

In another embodiment, the connection is routed from a preferred TURN server when the score of the preferred TURN server falls below a predefined threshold and restored to the preferred TURN server when the score of the preferred TURN server exceeds a predefined threshold.

In another embodiment, the score is further generated as a function of a black list score for a given application.

In another embodiment, the score for the at least one TURN server in the SD-WAN is determined based on at least one of an application generating traffic routed over the TURN server and a tenant using the TURN server.

Other aspects and advantages of embodiments of the present invention will become apparent from the following detailed description, taken in conjunction with the accompanying drawings, illustrated by way of example of the principles of the invention.

BRIEF DESCRIPTION OF THE DRAWINGS

Throughout the description, similar reference numbers may be used to identify similar elements.

DETAILED DESCRIPTION

It will be readily understood that the components of the embodiments as generally described herein and illustrated in the appended figures could be arranged and designed in a wide variety of different configurations. Thus, the following more detailed description of various embodiments, as represented in the figures, is not intended to limit the scope of the present disclosure, but is merely representative of various embodiments. While the various aspects of the embodiments are presented in drawings, the drawings are not necessarily drawn to scale unless specifically indicated.

The present invention may be embodied in other specific forms without departing from its spirit or essential characteristics. The described embodiments are to be considered in all respects only as illustrative and not restrictive. The scope of the invention is, therefore, indicated by the appended claims rather than by this detailed description. All changes which come within the meaning and range of equivalency of the claims are to be embraced within their scope.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussions of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize, in light of the description herein, that the invention can be practiced without one or more of the specific features or advantages of a particular embodiment. In other instances, additional features and advantages may be recognized in certain embodiments that may not be present in all embodiments of the invention.

Reference throughout this specification to "one embodiment," "an embodiment," or similar language means that a particular feature, structure, or characteristic described in connection with the indicated embodiment is included in at least one embodiment of the present invention. Thus, the phrases "in one embodiment," "in an embodiment," and similar language throughout this specification may, but do not necessarily, all refer to the same embodiment.

Figure 1:
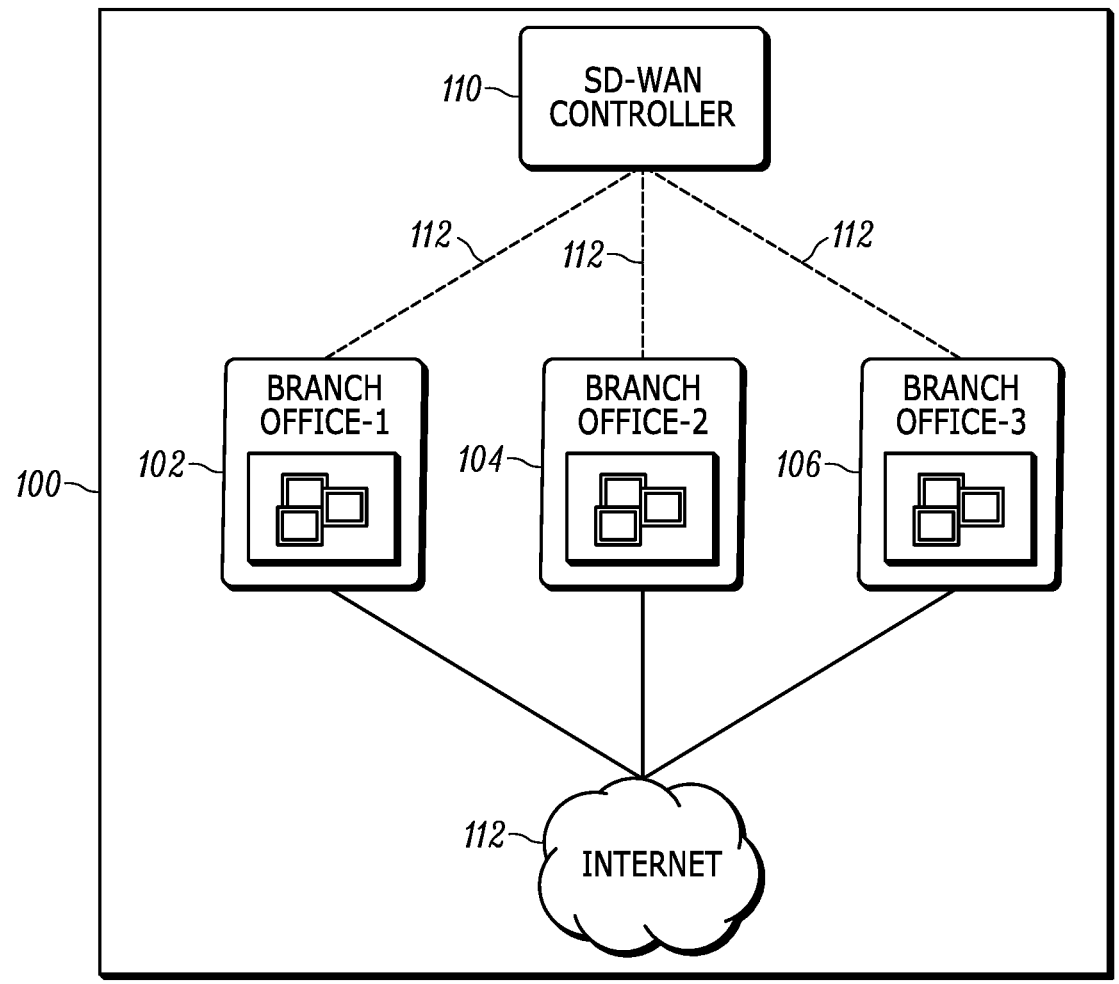
FIG. 1 depicts an example of a software-defined wide area network (SD-WAN).

A software-defined wide area network (SD-WAN) is a wide-area network in which the control plane has been separated from the data plane. Typically, the elements of the data plane, which facilitate the forwarding of traffic to selected destinations, are implemented in generic hardware and the control plane, which facilitates decisions about where traffic is sent in a network, is implemented in software running in the generic hardware. FIG. 1 depicts an example of SD-WAN 100. Nodes (virtual or physical) at Branch office-1 102, Branch-office 2 104, and Branch-office 3 106 are interconnected via the Internet, but other private links such as multiprotocol label switching (MPLS) could be used as well. An SD-WAN controller 110 uses private connections 112 established using Border Gateway Protocol (BGP) to monitor connections between branches (as well as other network elements) and to define routing patterns between various nodes in the SD-WAN. The SD-WAN controller can continuously monitor the connections and update routing patterns as needed. Once the routing patterns are established, the physical topology of the connections between nodes can be abstracted. An application running on one node can connect with another node using tunneling without any awareness of the underlying topology. Accordingly, the SD-WAN networks operates similarly to a network that has a full-mesh topology.

Figure 2:
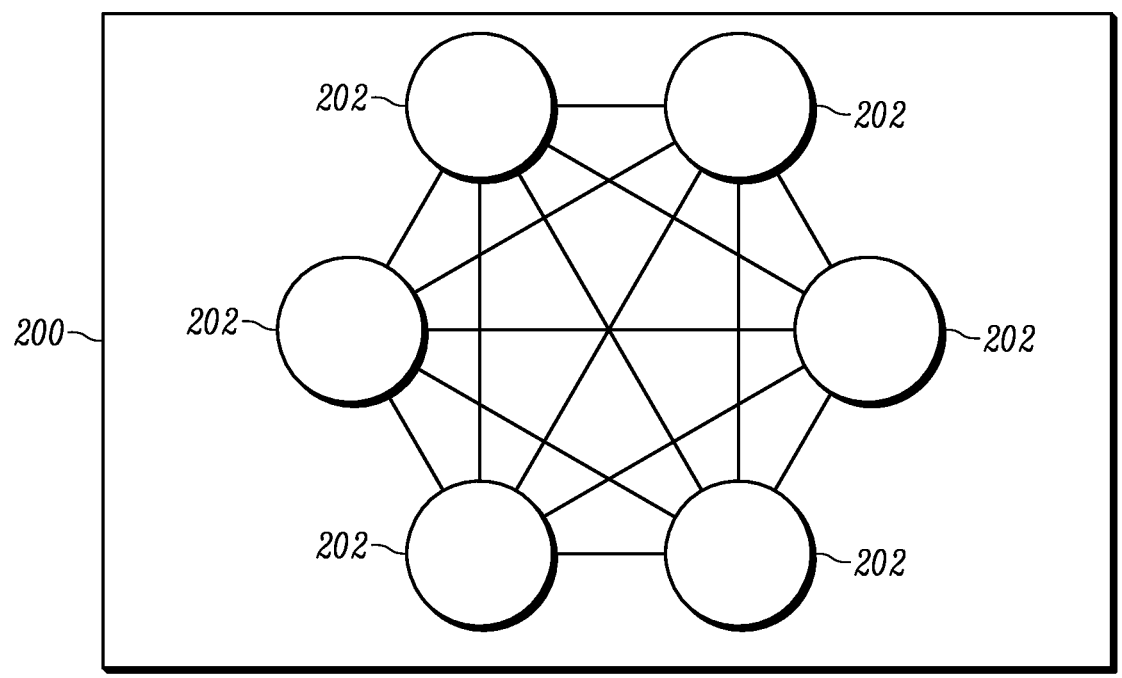
FIG. 2 depicts a network that has a full-mesh topology

FIG. 2 depicts a network 200 that has a full-mesh topology. Each node 202 in the network is connect directly to each other node in the network. In an embodiment, the network connections can be connections over the Internet (e.g., wide-area network connections) or local connections. A full mesh topology allows each node to communicate directly with each other node, which eliminates single points of failure for the network, and makes the network more secure because traffic between two nodes cannot be intercepted. However, in practice, networks may utilize NAT devices in order to allow several devices using multiple private IP addresses to utilize a shared public IP address. A NAT device is a device that performs network address translation by mapping IP addresses from one address realm to another. As defined, for example, by RFC 2663, a NAT device should have the following characteristics: transparent address assignment, transparent routing through address translation, and Internet Control Message Protocol (ICMP) error packet payload translation. The use of a NAT device can create challenges to maintaining a full mesh topology network.

Figure 3:
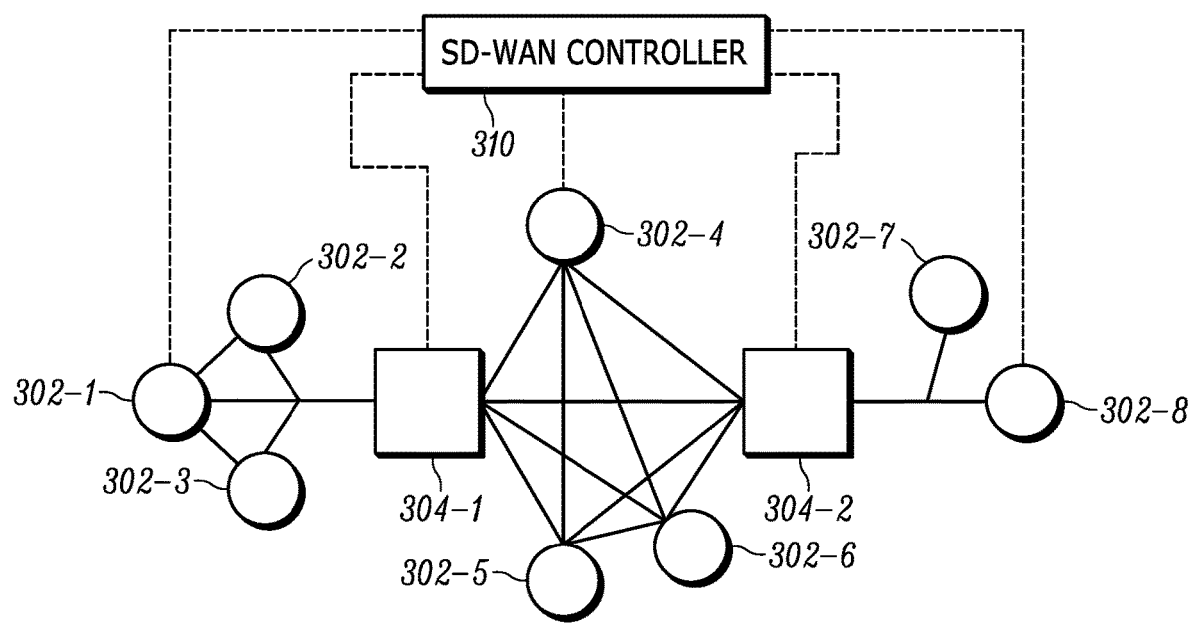
FIG. 3 depicts a typical network layout that includes NAT devices.

FIG. 3 depicts a typical network layout that includes NAT devices. The network includes nodes 302-1-302-8, NAT devices 304-1, 304-2, and a SD-WAN controller 310. Each element in the network (e.g., nodes and NAT devices) can be connected to the SD-WAN controller via, for example, an internet connection. For illustrative simplicity, only the connections with NAT devices 304-1 and 304-2 and with nodes 302-1, 302-4, and 302-8 are shown. While in FIG. 2, each node was directly connected to every other node, in FIG. 3, nodes 302-1-302-3 are behind NAT device 304-1 and nodes 302-7 and 302-8 are behind NAT device 304-2, while nodes 302-4-302-6 are not behind a NAT device. In a network where the NAT devices are endpoint independent, when node 302-1 wants to create a connection with node 302-4, node 302-1 connects to the SD-WAN controller via NAT device 304-1 to learn what external IP address and port number has been assigned to node 302-1 by the NAT device. NAT device 304-1 maintains a mapping of the private IP address of node 302-1 to the assigned IP address and port so that return messages can be sent back to node 302-1 using the assigned IP address and port. Thus, node 302-1 can send node 302-4 the IP address and port assigned by NAT device 304-1 as the return address. However, in a network where the NAT devices are endpoint dependent (e.g., in the case of a VPN), the NAT devices may assign, at least, a new port to a node for each different endpoint to which the node wants to connect. For example, a connection between node 302-1 and node 302-4 will use a different port than the port assigned to the connection between node 302-1 and the SD-WAN controller. Furthermore, connections by any other node (such as node 302-4) to node 302-1 using the port assigned to the connection with the SD-WAN controller will be denied. To resolve this, when nodes 302-1 and 302-4 want to connect, the two nodes can connect with the SD-WAN controller and the SD-WAN controller can direct whichever node is behind the NAT device (e.g. node 302-1) to initiate the communication. When the node 302-1 behind the NAT device initiates the communication, the NAT device 304-1 can then assign node 302-1 an IP address and port to which node 302-4 can send communications. However, if both nodes are behind different NAT devices, then this technique will fail. For example, if node 302-1 and 302-8 wanted to connect, neither node could initiate the connection because neither node would have an IP address and port with which to connect. That is, NAT device 304-1 would be unable to map a connection from node 302-8 to 302-1 because NAT device 304-1 would not know the IP address and port number assigned to node 302-8 by NAT device 304-2 and NAT device 304-2 would be unable to map a connection from node 302-1 to 302-8 because NAT device 304-2 would not know the IP address and port number assigned to node 302-1 by NAT device 304-1. Thus, while NAT devices can be an efficient solution for IP address conservation, if the NAT devices are endpoint dependent and both endpoints are behind a NAT device, then the NAT devices may break network functionality.

Figure 4:
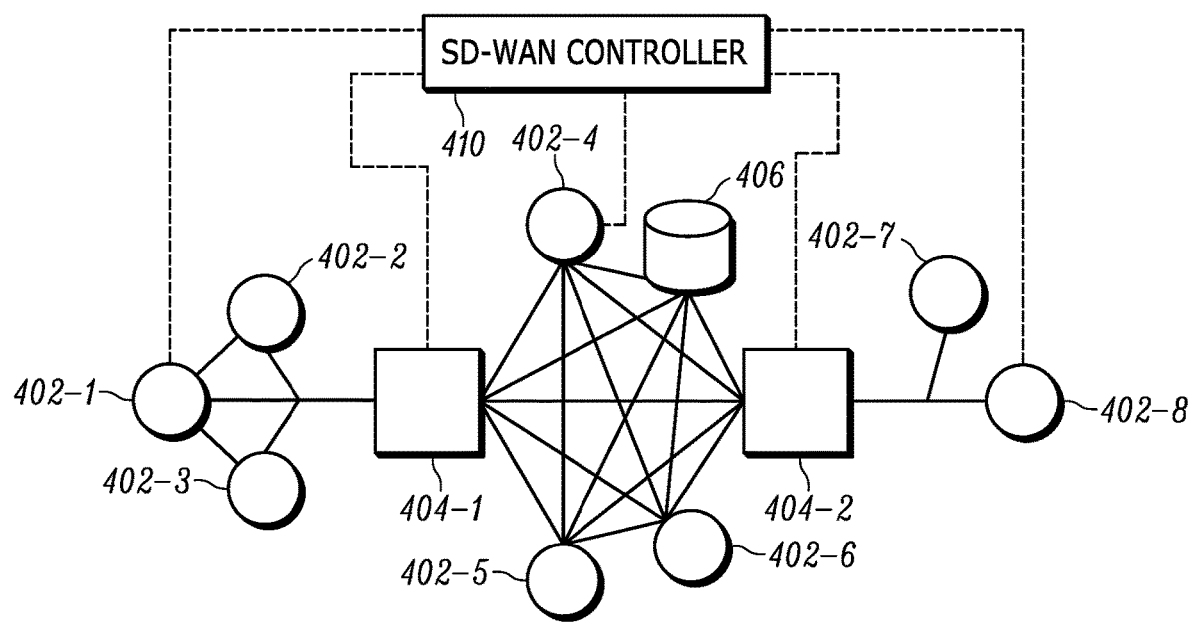
FIG. 4 depicts a typical network layout that includes NAT devices in which a TURN server has been incorporated.

To work around the problems introduced by NAT devices, a TURN server (e.g., as described in RFC 6062) can be used. FIG. 4 depicts a typical network layout that includes NAT devices in which a TURN server 406 has been incorporated. The network includes nodes 402-1-402-8, NAT devices 404-1, 404-2, a SD-WAN controller 410, and a TURN server 406. In an embodiment, any node note behind a NAT device can be a TURN server. Accordingly, both node 402-1 and node 403-8 can connect with TURN server 406 using a similar technique as the technique used by node 302-1 to connect with node 302-4 described with reference to FIG. 3. Thus, in FIG. 4, because both nodes can connect to the TURN server, the turn server can serve as a relay between the two nodes. In an embodiment, any node not behind a NAT device may be able to function as a TURN server.

Figure 5:
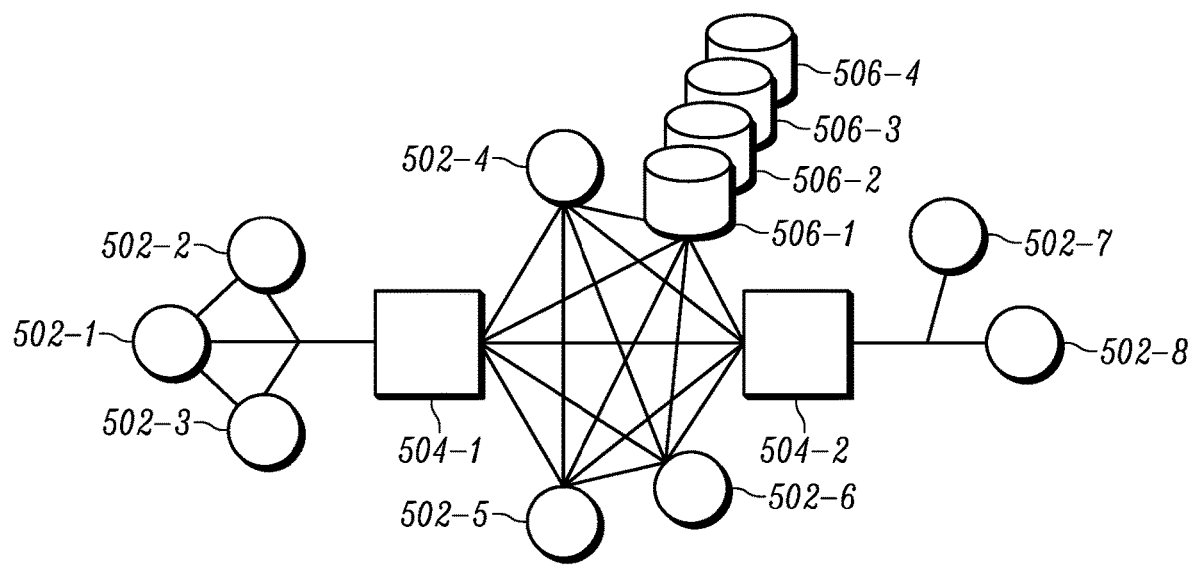
FIG. 5 depicts a typical network layout using NAT devices in which multiple TURN servers have been incorporated.

However, the incorporation of a TURN server into a SD-WAN is not without drawbacks. When using a TURN server, a connection between nodes is routed through a TURN server. As a result, the TURN server can become a bottleneck for the connection and, should the TURN server go down or become otherwise unavailable (e.g., overloaded), the TURN server can become a single point of failure. To address such drawbacks, multiple TURN servers can be incorporated within a network. FIG. 5 depicts a typical network layout that includes NAT devices in which multiple TURN servers have been incorporated. As shown in FIG. 5, the network includes nodes 502-1-502-8, NAT devices 504-1 and 504-2, and TURN servers 506-1-506-4. In operation, rather than all connections in the network using a single TURN server for all nodes, the network layout illustrated in FIG. 5 can be used, in which case each node can a have a higher or lower preference on each TURN server and connections can be balanced across the multiple TURN servers. Thus, if one TURN server goes down or becomes otherwise unavailable, connections can be re-routed to another TURN server.

Figure 6A:
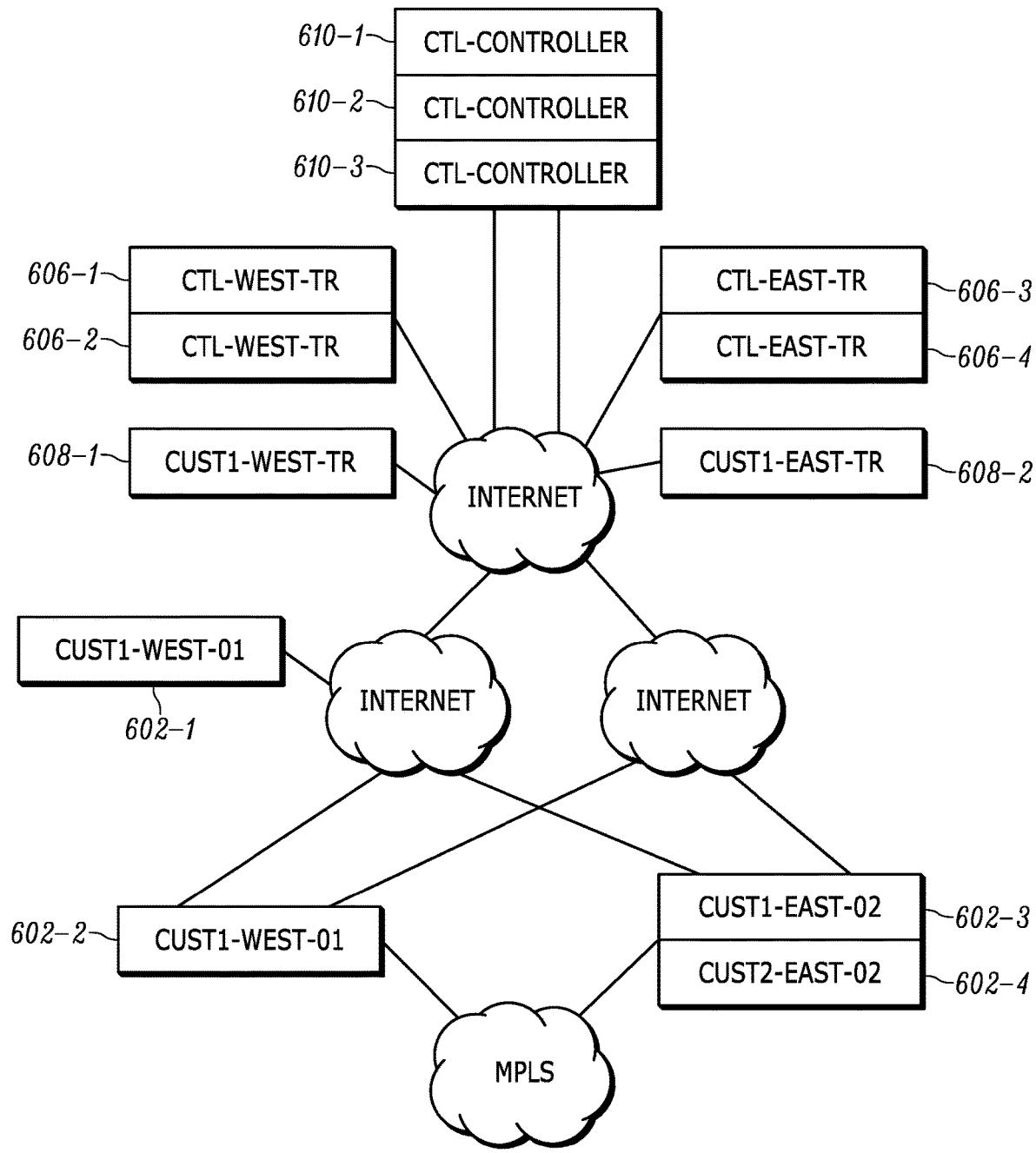
FIG. 6A depicts an SD-WAN in which private TURN servers are implemented and FIGS. 6B and 6C illustrate the flow of traffic across the SD-WAN of FIG. 6A when a connection is re-routed.
Figure 6B:
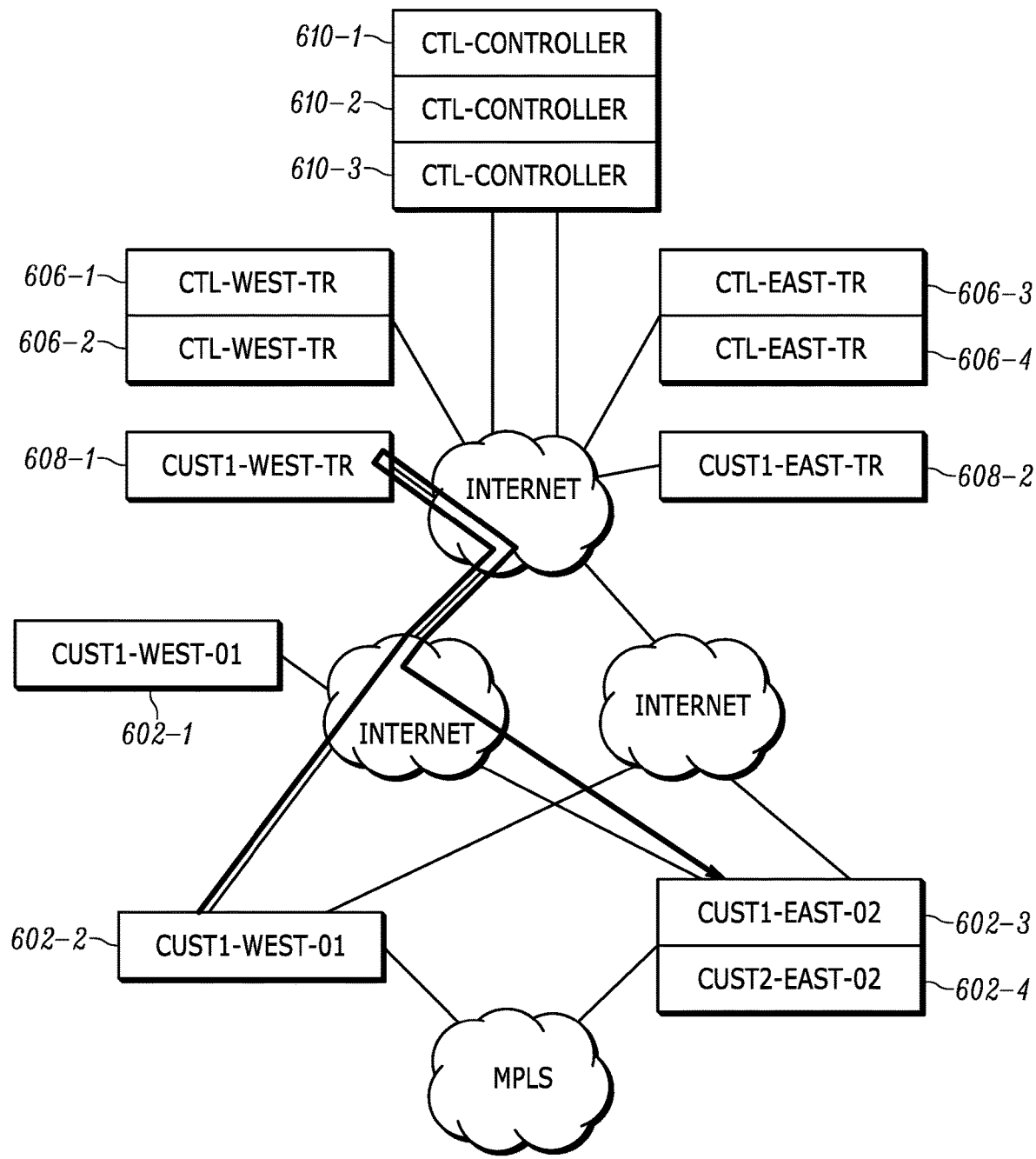
Figure 6C:
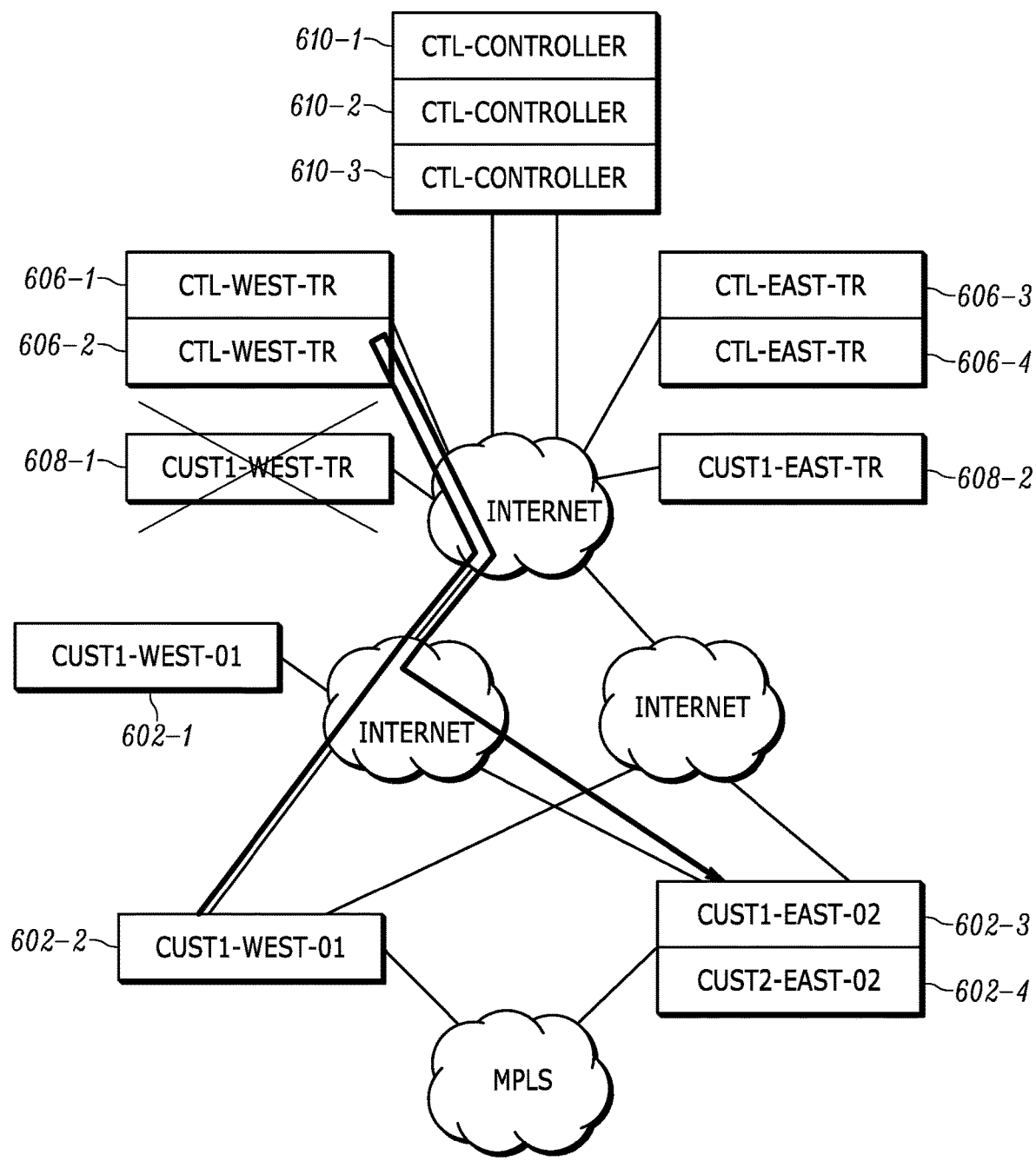

Additionally, a client can host a private TURN server and client nodes can be configured to prefer the private TURN server over other TURN servers in the SD-WAN. FIG. 6A depicts an SD-WAN in which private TURN servers 608-1 and 608-2 are implemented and FIGS. 6B and 6C illustrate the flow of traffic across the SD-WAN of FIG. 6A when a connection is re-routed. In the embodiment of FIG. 6A, three controllers 610-1-610-3 (e.g., SD-WAN controllers) manage an SD-WAN for nodes 602-1-602-4 of a first customer and nodes of a second customer (not shown) in an east branch (e.g., a New York-based office) and a west branch (e.g., a San Francisco-based office). The SD-WAN further includes public TURN servers 606-1-606-4, which are usable by any node in the SD-WAN, and private TURN servers 608-1, 608-2, which are usable only by nodes of the first customer (e.g., nodes 602-1-602-4).

As illustrated in FIG. 6B, a node 602-2 (Cust1-West-B1) of the first customer on the west branch making a connection with a node 602-3 (Cust1-East-B2) of the first customer on the east branch is configured to prefer routing the connection over the Cust1-West-TR TURN server 608-1 (e.g., the preferred TURN server). However, if the Cust1-West-TR TURN server goes down, becomes over-encumbered, or becomes otherwise unavailable, as illustrated in FIG. 6C, then the connection will be re-routed over a TURN server available to all customers on the west branch (CTL-West-TR) such as TURN server 606-2.

However, in order to determine if a preferred TURN server is unavailable and a connection should be re-routed over an alternative TURN server, the controller and nodes in an SD-WAN should be able to determine the state of TURN servers in the SD-WAN. Additionally, in order to determine over which alternative TURN server a connection should be re-routed, the controller and nodes in an SD-WAN should be able to determine an array of metrics about the alternative TURN servers.

In accordance with an embodiment of the invention, a method for routing connections in an SD-WAN is disclosed. The method involves receiving TURN server performance metrics via Border Gateway Protocol (BGP) and receiving network performance metrics from calculations made using Service Level Agreement (SLA) protocol data units (PDUs) for TURN servers in an SD-WAN, generating a score for at least one TURN server in the SD-WAN based on the received TURN server performance metrics and received network performance metrics for the at least one TURN server, selecting a TURN server based on the score generated for the at least one TURN server, and routing a connection over the selected TURN server. Thus, by using out-of-band communications (e.g., BGP update messages) and in-band communications (e.g., SLA PDUs), controllers and nodes in a network can determine the state of TURN servers in an SD-WAN and select which TURN server to route a connection over as needed.

Figure 7:
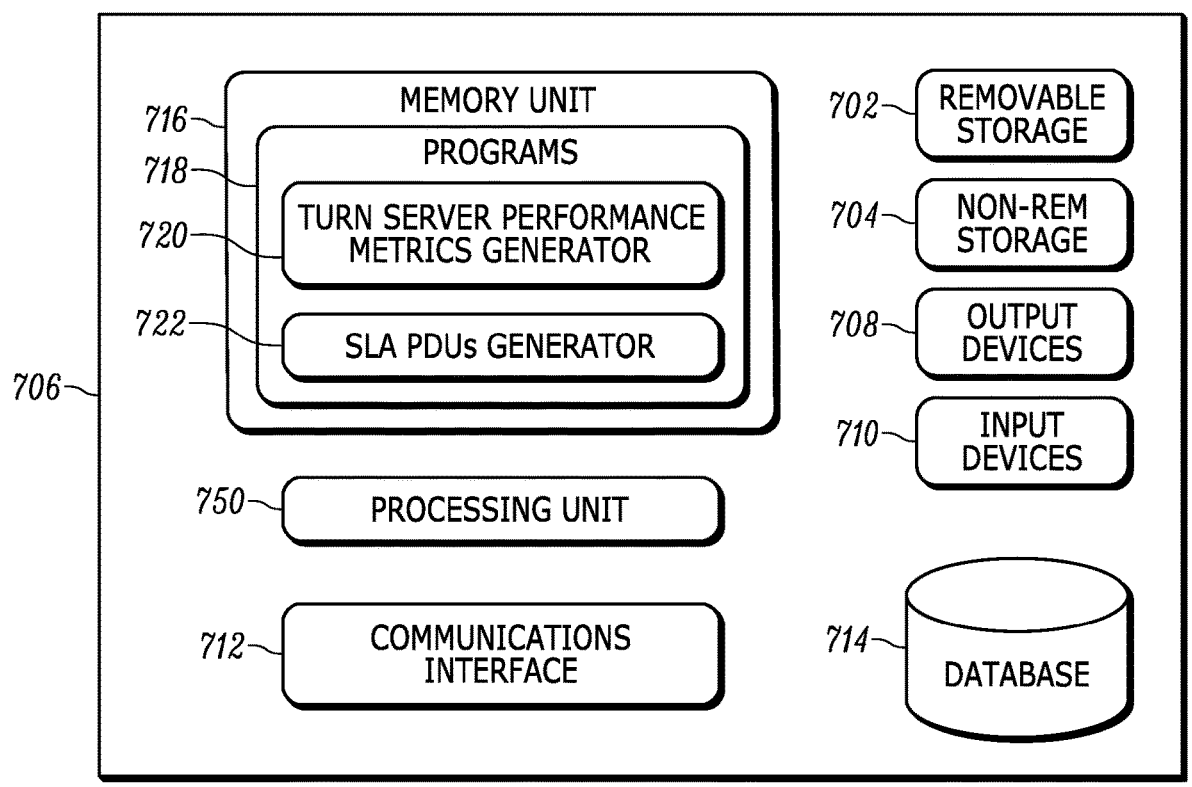
FIG. 7 depicts a functional block diagram of an exemplary TURN server.

FIG. 7 depicts a functional block diagram of an exemplary TURN server 706, in accordance with an embodiment of the invention. The TURN server may include at least one processing unit 750, removable storage 702, non-removable storage 704, output devices 708, input devices 710, a communications interface 712, a database 714, and a memory unit 716. Memory, such as the removable storage, non-removable storage, or memory unit, may be implemented using any machine-readable or computer-readable media capable of storing data, including both volatile and non-volatile memory. For example, the memory unit may include read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, or any other type of media suitable for storing information. The input devices may include, for example, a keyboard, mouse, pen, voice input device, touch input device, measurement devices, or sensors. The output devices may include, for example, displays, speakers, or printers. The communications interface allows the TURN server to communicate with other devices and may include, for example, various types of standard communication elements such as one or more network interfaces, network interface cards (NIC), radios, wireless transmitters/receivers (transceivers), wired and/or wireless communication media, or physical connectors. As shown in FIG. 7, the memory unit may store various software programs 718 including a TURN server performance metrics generator program 720 and a SLA PDUs generator program 722. The TURN server performance metrics generator program monitors performance properties of the TURN server and transmits corresponding metrics using BGP, as described with reference to FIGS. 8 and 9. The SLA PDUs generator program monitors network properties and transmits corresponding metrics using SLA PDUs, as described with reference to FIG. 10.

Figure 8:
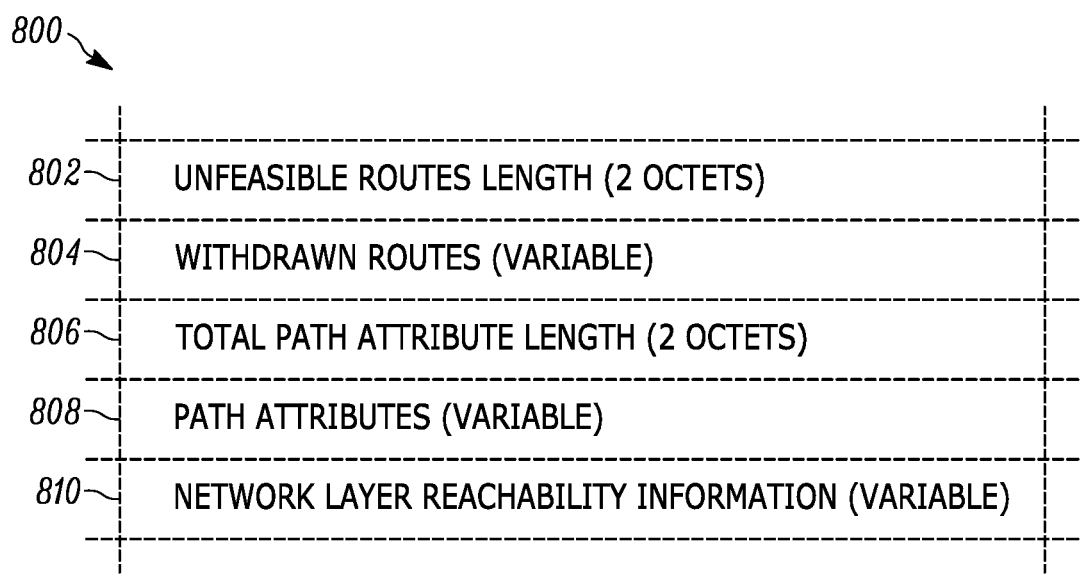
FIG. 8 depicts the format of a Border Gateway Protocol (BGP) update message.

TURN server performance metrics can be received (e.g., by the SD-WAN controller or a branch node) using BGP and may include, for example, metrics regarding the hardware configuration of the TURN server (e.g., CPU and memory), a TURN server group name, or the current load on the TURN server. In an embodiment, TURN server performance metrics are collected using BGP update messages. FIG. 8 depicts the format of a BGP update message 800. A BGP update message includes an unfeasible routes length field 802, a withdrawn routes field 804, a total path attribute length field 806, a path attributes field 808, and a Network Layer Reachability Information (NLRI) field 810. In an embodiment, TURN server performance metrics can be sent using the NLRI field. Typically, the NLRI field is used to list IP address prefixes. In accordance with an embodiment of the invention, the NLRI field can be used to carry TURN server performance metrics as an information blob without requiring a new or separate protocol. The receiving party (e.g., the SD-WAN controller or a branch node) can parse the NLRI field and determine that the information blob contains TURN server performance metrics.

Figure 9:
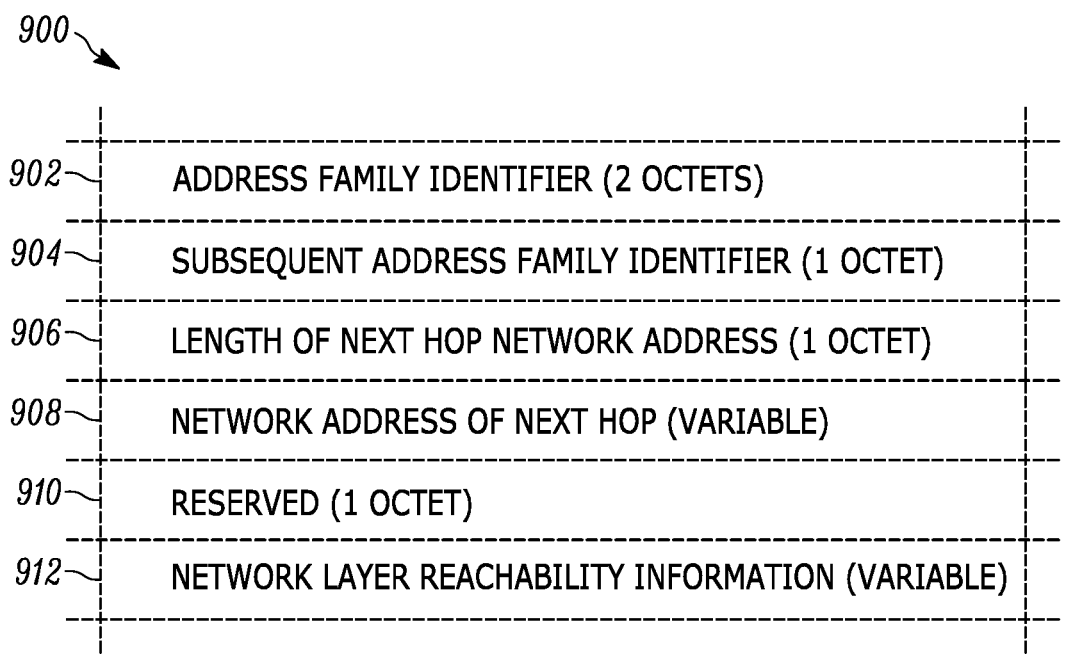
FIG. 9 depicts the format of a BGP Network Layer Reachability Information (NLRI) field.

FIG. 9 depicts the format of a BGP NLRI field 900 such as the NLRI field 810, in FIG. 8. As depicted in FIG. 9, the format of a BGP NLRI field includes an Address Family Identifier 902, a Subsequent Address Family Identifier 904, a Length of a Next Hop Network Address 906, a Network Address of the Next Hop 908, reserved bits 910, and Network Layer Reachability Information 912. In an embodiment, TURN server performance metrics can be contained in the BGP NLRI field as follows: the Address Family Identifier is set for IPv4, the Subsequent Address Family Identifier is set to Private, the Length of a Next Hop Network Address is set to 4, the Network Address of the Next Hop is set to the ID of the originating TURN server, the reserved bits are set to 0, and the Network Layer Reachability Information is set to the TURN server ID followed by a value (e.g., 0x02) and a blob of information containing the TURN server performance metrics. In an embodiment, the value can serve as an indicator that the blob of information contains TURN server performance metrics. In other embodiments, alternative techniques can be used to transmit TURN server performance metrics using BGP.

Network performance metrics can be received from calculations made using SLA PDUs and include metrics such as link delay, link delay variation, loss, or other metrics used to determine the quality of the link between a node or a controller and the TURN server. In an embodiment, a TURN server can send SLA PDUs over a connection on a defined interval to a node or a controller. The node or controller can perform calculations using the SLA PDUs to calculate network performance metrics by extracting operational information about the TURN server from, for example, a data field of the SLA PDU. Operational information can include operational information communicated by ICMP messages, but can also include other information communicable by each layer of the OSI stack. For example, a TURN server can include a timestamp corresponding to the time at which an SLA PDU is sent as operational information in the SLA PDU and the node or controller can calculate link delay by extracting the timestamp from the operational information and calculating the difference between the timestamp and the time at which the SLA PDU is received by the node or controller (e.g., link delay). In another example, a TURN server can mark SLA PDUs with sequential IDs and the node or controller can determine that a connection is experiencing loss if an SLA PDU with a non-sequential ID is received (e.g., if SLA PDU 1, 2, and 4 are received, SLA PDU 4 would have a non-sequential ID).

Figure 10:
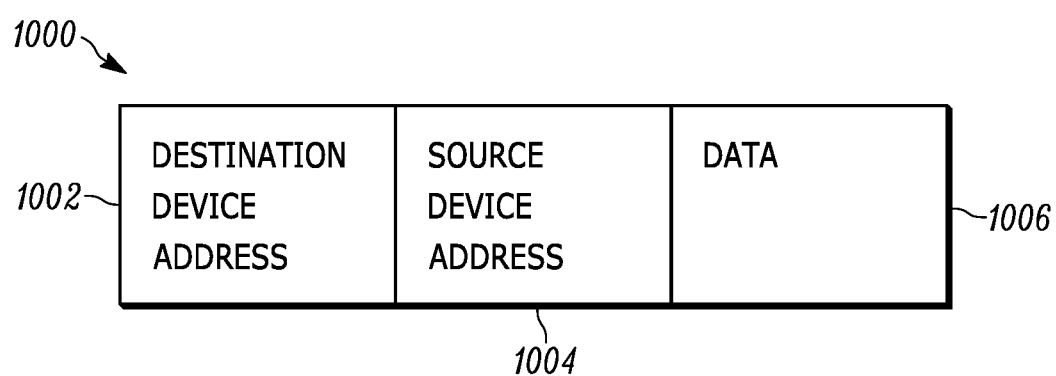
FIG. 10 depicts the format of a protocol data unit (PDU).

FIG. 10 depicts the format of a PDU 1000. Specifically, a PDU generated by Layer 2 of the Open Systems Interconnection model (OSI model). The Layer 2 PDU includes a destination device address field 1002, a source device address field 1004, and a data field 1006. The data field can include additional encapsulated PDUs from higher layers, such as a Layer 3 PDU (e.g., a packet) or a Layer 4 PDU (e.g., a UDP datagram). A PDU can be configured as an SLA PDU by configuring the PDU to carry information used in measuring SLA performance. For example, the data field can carry information about transmission timestamps, a "time to live" (TTL) value indicating a hop count between the TURN server and a recipient (e.g., a node or a controller), or an echo request message indicating packet loss. Additionally, rather than detecting packet loss using, for example, an echo request, a source endpoint (e.g., a node or a TURN server) can be configured to count a number of packets sent to a destination endpoint over a given window of time. At the end of the window of time, the source endpoint can send to the destination endpoint a SLA PDU configured to indicate the number of packets sent and the length of the window. The destination endpoint can compare the number of packets indicated as sent with the number of packets received during the window and determine a percentage of packets lost. The destination endpoint can then send the percentage back to the source endpoint.

Figure 11:
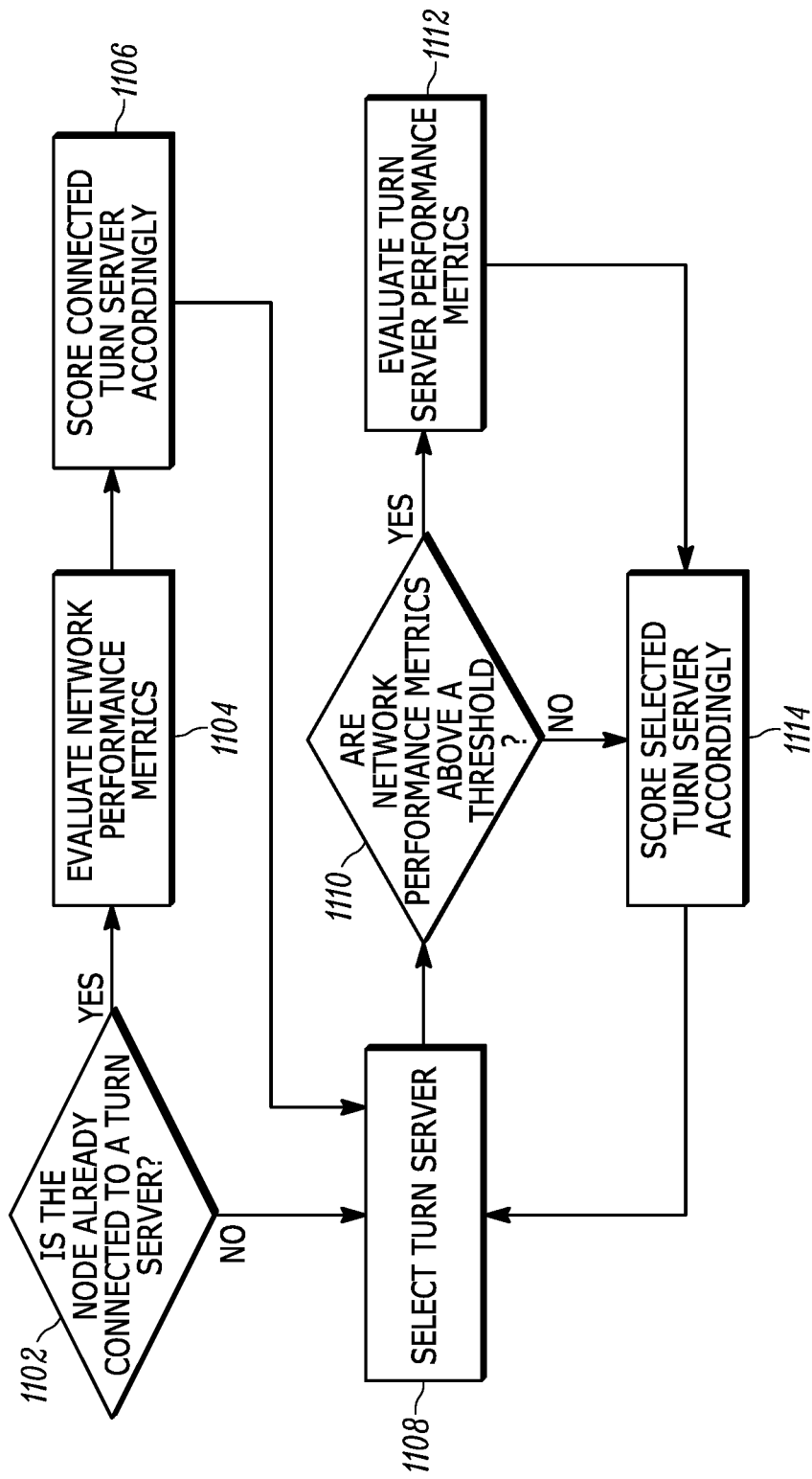
FIG. 11 is a flow chart diagram of a technique for generating a score for a TURN server for a specific node.

Once the TURN server metrics and the network performance metrics are received from a TURN server, a score can be generated for the TURN server. In an embodiment, a score refers to a position in an order of preference. For example, if a SD-WAN network has three TURN servers, the preferred TURN server may have the best score (e.g., highest, lowest, first, etc.) indicating that it is to be selected. A score can be generated by determining an order of preference amongst the TURN servers in the SD-WAN network. FIG. 11 is a flow chart diagram of a technique for generating a score for a TURN server for a specific node. At decision point 1102, it is determined if the specific node is already connected to a TURN server. For example, if the technique for generating a score for a TURN server is run while a session between the specific node and a TURN server is ongoing, then it is determined that the specific node is already connected to a TURN server. If the specific node is already connected to a TURN server, then, at block 1104, the SD-WAN network performance metrics of the connected TURN server are evaluated to determine if the network performance metrics are above a threshold and, at block 1106, the connected TURN server is scored accordingly. For example, if a threshold limits packet loss to 1%, then, if the connected TURN server is reporting no packet loss (e.g., 0% packet loss), the network performance metrics of the connected TURN server will be evaluated as above the defined threshold. Accordingly, the connected TURN server can be scored highly such that traffic will continue to be routed over the connected TURN server. Alternatively, if the TURN server is reporting 5% packet loss, then the network performance metrics of the connected TURN server will be evaluated as below the defined threshold and the TURN server can be scored poorly such that traffic will likely be routed over a different TURN server in the SD-WAN network.

In an embodiment, if the network performance metrics of the connected TURN server are evaluated as above the defined threshold and the connected TURN server is scored highly, the connected TURN server can be selected without further evaluation of other TURN servers in the SD-WAN network. In another embodiment, other TURN servers in the SD-WAN network may still be evaluated before a TURN server is selected. For example, as shown in the flow chart diagram, at block 1108, another TURN server in the SD-WAN network can be selected for evaluation and scoring and, at decision point 1110, network performance metrics of the selected TURN server can be evaluated. However, unlike the steps described when the specific node is already connected to the TURN server, other TURN servers in the SD-WAN network with network performance metrics evaluated as above a threshold must still be further evaluated to determine if TURN server performance metrics are also above a threshold. The additional evaluation is needed because if the specific node begins routing traffic over the TURN server, the load on the TURN server will increase, which may cause network performance metrics to drop below a threshold. For example, a TURN server at maximum capacity will report 0% packet loss and so network performance metrics may be evaluated above a threshold. However, once the specific node begins routing traffic over the TURN server, the TURN server will become overloaded and begin dropping packets. Thus, at block 1112, the TURN server performance metrics of the TURN server are evaluated to determine if the TURN server performance metrics are also above a defined threshold and then, at block 1114, the TURN server is scored accordingly. In an embodiment, the score of a TURN server can be affected by a black list score for a given application. For example, a node running Application A may determine that a particular TURN server configuration would interfere with the performance of Application A and may assign a score penalty to TURN servers so configured. In another embodiment, the score of a TURN server can be generated as a function of a manually determined score. That is, a user can manually increase or decrease the score of a TURN server as needed. Once the TURN server has been scored, the technique returns to block 1108 and the next TURN server is selected for evaluation and scoring. Once all of the TURN servers in the network have been evaluated and scored, a TURN server can be selected. In an embodiment, the TURN server with the highest score is selected, but, in other embodiments, a TURN server within a certain percentile can be selected.

In an embodiment, the threshold for network performance metrics and the threshold for TURN server performance metrics can be pre-defined by a user. In another embodiment, each time a TURN server is evaluated, if the evaluated metric is above the corresponding threshold, the threshold is raised to the level at which the metric is evaluated. For example, if a network performance metric threshold is pre-defined at 5% packet loss, when network performance metrics for a TURN server are evaluated at 1% packet loss, then the network performance metric threshold will be raised to 1% packet loss. In another embodiment, the score for a TURN server can be determined on a per application and/or per tenant basis by defining the threshold for network performance metrics and the threshold for TURN server performance metrics based on the application generating traffic and/or on the tenant using the TURN server. For example, if an application running on a node is generating video streaming traffic, a higher TURN server performance metric threshold may be defined than if an application running on a node is generating low-resource consuming traffic.

Figure 12:
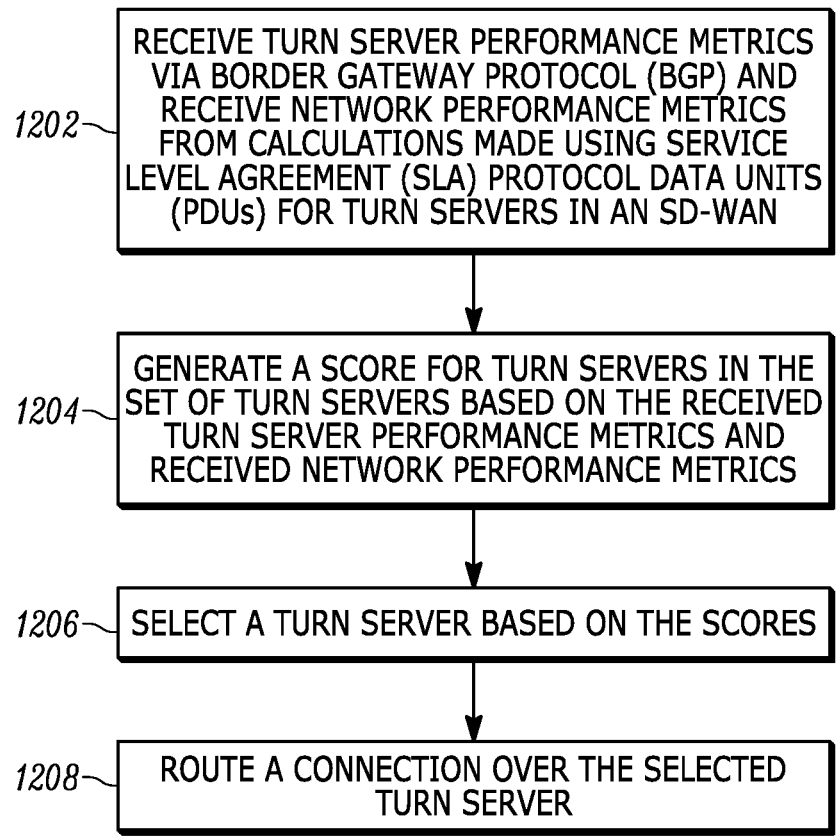
FIG. 12 is a flow chart diagram of a method for routing a connection in an SD-WAN network in accordance with an embodiment of the invention.

FIG. 12 is a flow chart diagram of a method for routing a connection in an SD-WAN network in accordance with an embodiment of the invention. In an embodiment, an SD-WAN can include multiple TURN servers (e.g., as illustrated in FIG. 5 above). Controllers and nodes on the SD-WAN can be configured to communicate with the TURN servers on regular intervals using Border Gateway Protocol (BGP) or other out-of-band communications or using Service Level Agreement (SLA) protocol data units (PDUs) or other in-band communications. Note that BGP is considered an out-of-band communication because a separate channel or connection between controllers or nodes is used to communicate BGP messages than is used to communicate a data flow between, for example, a node and a TURN server or a node and another node over a TURN server (e.g., TCP/IP or UDP/IP). SLA PDUs are considered in-band communication because they are communicated over the same channel used to communicate a data flow between, for example, a node and a TURN server or a node and another node over a TURN server (e.g., TCP/IP or UDP/IP).

At block 1202, information about TURN servers in an SD-WAN is received via BGP and/or received from calculations made using SLA PDUs. For example, the number of CPU cores or the number of active sessions in a TURN server can be received via BGP or the packet loss by the TURN server can be calculated from SLA PDUs received. In an embodiment, the calculations can be made locally by each node in the SD-WAN or by a SD-WAN controller. At block 1204, a score is generated for TURN servers in the SD-WAN based on the received TURN server performance metrics and received network performance metrics. In an embodiment, the information can be divided into network performance metrics such as loss or delay and TURN server performance metrics such as hardware configurations or load. A score can be generated for each TURN server as a function of the network performance metrics and the TURN server performance metrics as described with reference to FIG. 11 above. In another embodiment, the score can be further generated as a function of a black list score for a given application. For example, a node running Application A may determine that a TURN server is configured in a manner that would interfere with the performance of Application A and assign a penalty to the TURN server. In another embodiment, the score can be further generated as a function of a manually determined score. For example, a user can add a penalty to the score generated by a particular node for an unfavorable TURN server to prevent the particular node from using the unfavorable TURN server. Alternatively, a user can apply a penalty to other TURN servers in an SD-WAN to establish a private TURN server as the preferred TURN server during initial configuration of the SD-WAN or apply different penalties to each TURN server in the SD-WAN to create an order of preference. An overall TURN server score can be generated as a function of the TURN server performance score, the network performance score, and any additional scores (e.g., a black list score). At block 1206, a TURN server is selected based on the scores of TURN servers in the SD-WAN. For example, the TURN server with the highest score may be selected. Alternatively, a TURN server with a score in a defined percentile may be selected. At block 1208, a connection is routed over the selected TURN server. In an embodiment, the connection is routed by updating the configuration of a controller on the SD-WAN.

In accordance with an embodiment of the invention, information can be continuously received, as described at block 1202, or received on a given interval and TURN servers can be rescored. Additionally, a threshold can be defined (e.g., either by a user or automatically) and a connection can be re-routed when the score of the TURN server over which a connection is currently routed (a preferred TURN server) falls below the predefined threshold and the connection can be restored to the preferred TURN server when the score of the preferred TURN server again exceeds a predefined threshold. In another embodiment, if SLA PDUs from a TURN server cease to be received, the TURN server can be rescored such that connections over the TURN server will be re-routed. Similarly, if a TURN server reports a TURN server performance metric that violates a predefined condition (e.g., the load on the TURN server exceeds a predefined level), then the TURN server can be rescored such that connections over the TURN server will be re-routed.

Thus, in accordance with an embodiment of the invention, VPN functionality broken by NAT devices can be restored using TURN servers and nodes can be configured with preferences for a certain TURN server. However, TURN servers can become unavailable. By collecting information about TURN servers in the SD-WAN and scoring the TURN servers based on the collected information, a TURN server can be selected based on the scores and a connection can be routed over the selected TURN server. The information can be collected using SLA PDUs, but because the TURN servers are in an SD-WAN, the information can also be collected using BGP update messages, which allows for information not available via SLA PDUs to be considered when scoring TURN servers. In accordance with an embodiment of the invention, information can be continuously received or received on a given interval to rescore TURN servers and a connection can be re-routed over a different TURN server based on the rescoring. Thus, network functionality can continue uninterrupted if a TURN server goes down or becomes otherwise unavailable, which prevents TURN servers from becoming a single point of failure in an SD-WAN.

Although the operations of the method(s) herein are shown and described in a particular order, the order of the operations of each method may be altered so that certain operations may be performed in an inverse order or so that certain operations may be performed, at least in part, concurrently with other operations. In another embodiment, instructions or sub-operations of distinct operations may be implemented in an intermittent and/or alternating manner.

It should also be noted that at least some of the operations for the methods may be implemented using software instructions stored on a computer useable storage medium for execution by a computer. As an example, an embodiment of a computer program product includes a computer useable storage medium to store a computer readable program that, when executed on a computer, causes the computer to perform operations, as described herein.

Furthermore, embodiments of at least portions of the invention can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

The computer-useable or computer-readable medium can be an electronic, magnetic, optical, electromagnetic, infrared, or semiconductor system (or apparatus or device), or a propagation medium. Examples of a computer-readable medium include a semiconductor or solid state memory, magnetic tape, a removable computer diskette, a random access memory (RAM), a read-only memory (ROM), a rigid magnetic disc, and an optical disc. Current examples of optical discs include a compact disc with read only memory (CD-ROM), a compact disc with read/write (CD-R/W), a digital video disc (DVD), and a Blu-ray disc.

In the above description, specific details of various embodiments are provided. However, some embodiments may be practiced with less than all of these specific details. In other instances, certain methods, procedures, components, structures, and/or functions are described in no more detail than to enable the various embodiments of the invention, for the sake of brevity and clarity.

Although specific embodiments of the invention have been described and illustrated, the invention is not to be limited to the specific forms or arrangements of parts so described and illustrated. The scope of the invention is to be defined by the claims appended hereto and their equivalents.

What is claimed is:

1. A method for routing connections in a software-defined wide area network (SD-WAN), the method comprising:
   receiving Transversal Using Relays around network address translation (TURN) server performance metrics via Border Gateway Protocol (BGP) and receiving network performance metrics that were generated from calculations made using Service Level Agreement (SLA) protocol data units (PDUs) for a plurality of TURN servers in an SD-WAN, wherein the SLA PDUs are Layer 2 PDUs communicated over the same channel used to communicate a data flow between a node and a TURN server or between a node and another node over a TURN server;
   generating a score corresponding to each one of the plurality of TURN servers in the SD-WAN based on the received TURN server performance metrics and the received network performance metrics for the plurality of TURN servers, wherein the score refers to an order of preference amongst the plurality of TURN servers in the SD-WAN;
   selecting a TURN server from the plurality of TURN servers based on the score generated for each one of the plurality of TURN servers, wherein the selected TURN server is the TURN server with the highest order of preference amongst the plurality of TURN servers in the SD-WAN; and
   routing a connection over the selected TURN server.

2. The method of claim 1, wherein the connection is routed from a preferred TURN server when the score of the preferred TURN server falls below a predefined threshold and restored to the preferred TURN server when the score of the preferred TURN server exceeds a predefined threshold.

3. The method of claim 1, wherein generating the score for the at least one TURN server in the SD-WAN comprises:
   scoring network performance as a function of the network performance metrics; and
   scoring TURN server performance as a function of the TURN server performance metrics; and
   generating the score as a function of the network performance score and the TURN server performance score.

4. The method of claim 3, wherein the score is further generated as a function of a black list score for a given application.

5. The method of claim 3, wherein the score is further generated as a function of a manually determined score.

6. The method of claim 3, wherein scoring network performance as a function of the network performance metrics comprises evaluating network performance metrics of the at least one TURN server to determine if the network performance metrics exceed a threshold.

7. The method of claim 3, wherein scoring TURN server performance metrics comprises evaluating TURN server performance metrics of the at least one TURN server to determine if the TURN server performance metrics exceed a threshold.

8. The method of claim 3, wherein the score for the at least one TURN server in the SD-WAN is determined based on at least one of an application generating traffic routed over the TURN server and a tenant using the TURN server.

9. A system for routing connections in a software-defined wide area network (SD-WAN) comprising:
   a SD-WAN controller; and
   a plurality of nodes communicatively coupled to the SD-WAN controller;
   wherein, at least one of the SD-WAN controller and a node in the plurality of nodes is configured to:
      receive Transversal Using Relays around network address translation (TURN) server performance metrics via Border Gateway Protocol (BGP) and receiving network performance metrics that were generated from calculations made using Service Level Agreement (SLA) protocol data units (PDUs) for a plurality of TURN servers in an SD-WAN, wherein the SLA PDUs are Layer 2 PDUs communicated over the same channel used to communicate a data flow between a node and a TURN server or between a node and another node over a TURN server;
      generate a score corresponding to each one of the plurality of TURN servers in the SD-WAN based on the received TURN server performance metrics and the received network performance metrics for the plurality of TURN servers, wherein the score refers to an order of preference amongst the plurality of TURN servers in the SD-WAN;
      select a TURN server from the plurality of TURN servers based on the score generated for each one of the plurality of TURN servers, wherein the selected TURN server is the TURN server with the highest order of preference amongst the plurality of TURN servers in the SD-WAN; and
      route a connection over the selected TURN server.

10. The system of claim 9, wherein the connection is routed from a preferred TURN server when the score of the preferred TURN server falls below a predefined threshold and restored to the preferred TURN server when the score of the preferred TURN server exceeds a predefined threshold.

11. The system of claim 9, wherein the system is configured to generate the score for at the least one TURN server in the SD-WAN by:
   scoring network performance as a function of the network performance metrics; and
   scoring TURN server performance as a function of the TURN server performance metrics; and
   generating the score as a function of the network performance score and the TURN server performance score.

12. The system of claim 11, wherein the score is further generated as a function of a black list score for a given application.

13. The system of claim 11, wherein the score is further generated as a function of a manually determined score.

14. The system of claim 11, wherein scoring network performance as a function of the network performance metrics comprises evaluating network performance metrics of the at least one TURN server to determine if the network performance metrics exceed a threshold.

15. The system of claim 11, wherein scoring TURN server performance metrics comprises evaluating TURN server performance metrics of the at least one TURN server to determine if the TURN server performance metrics exceed a threshold.

16. The system of claim 11, wherein the score for the at least one TURN server in the SD-WAN is determined based on at least one of an application generating traffic routed over the TURN server and a tenant using the TURN server.

17. A method for routing connections in a software-defined wide area network (SD-WAN), the method comprising:
receiving Border Gateway Protocol (BGP) update messages from Transversal Using Relays around network address translation (TURN) servers of a set of TURN servers in a SD-WAN;
extracting TURN server performance metrics from a Network Layer Reachability Information (NLRI) field in the BGP update messages;
receiving Service Level Agreement (SLA) protocol data units (PDUs) from the TURN servers, wherein the SLA PDUs are Layer 2 PDUs communicated over the same channel used to communicate a data flow between a node and a TURN server or between a node and another node over a TURN server;
extracting operational information from the SLA PDUs;
calculating network performance metrics for the TURN servers from the operational information extracted from the SLA PDUs;
generating scores corresponding to the TURN servers based on the TURN server performance metrics and the network performance metrics, wherein the scores refer to an order of preference amongst the TURN servers in the set of TURN servers;
selecting a TURN server from the set of TURN servers in the SD-WAN based on the scores generated for the TURN servers in the set of TURN servers, wherein the selected TURN server is the TURN server with the highest order of preference amongst the set of TURN servers in the SD-WAN; and
routing a connection over the selected TURN server.

18. The method of claim 17, wherein the connection is routed from a preferred TURN server when the score of the preferred TURN server falls below a predefined threshold and restored to the preferred TURN server when the score of the preferred TURN server exceeds a predefined threshold.

19. The method of claim 17, wherein the score is further generated as a function of a black list score for a given application.

20. The method of claim 17, wherein the score for the at least one TURN server in the SD-WAN is determined based on at least one of an application generating traffic routed over the TURN server and a tenant using the TURN server.

* * * * *